July 1, 1941.  C. PAOLILLO  2,247,889
LIQUID FUEL BURNER
Filed March 30, 1938  2 Sheets-Sheet 1
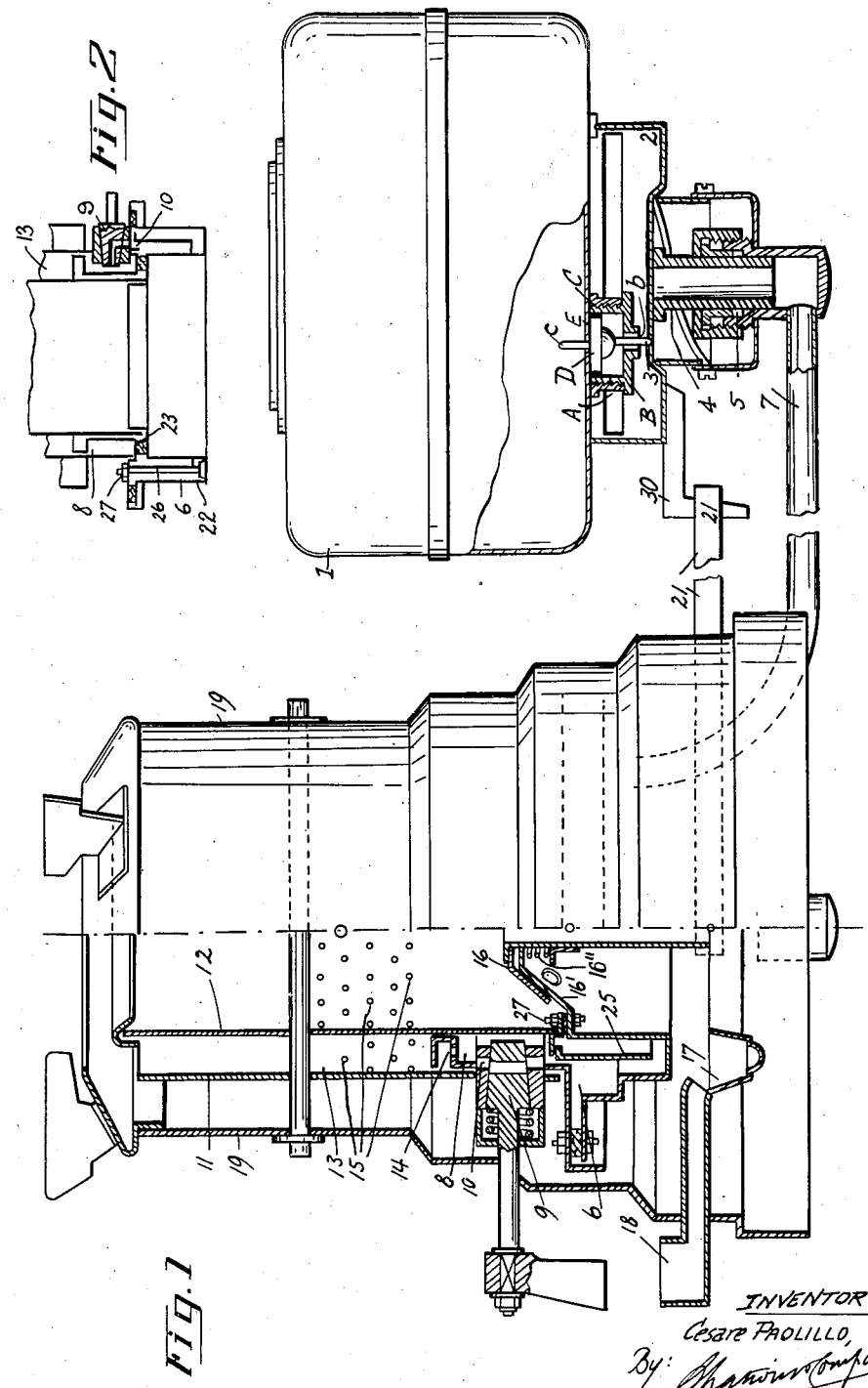
INVENTOR:
Cesare PAOLILLO, July 1, 1941.   C. PAOLILLO   2,247,889
LIQUID FUEL BURNER
Filed March 30, 1938   2 Sheets-Sheet 2
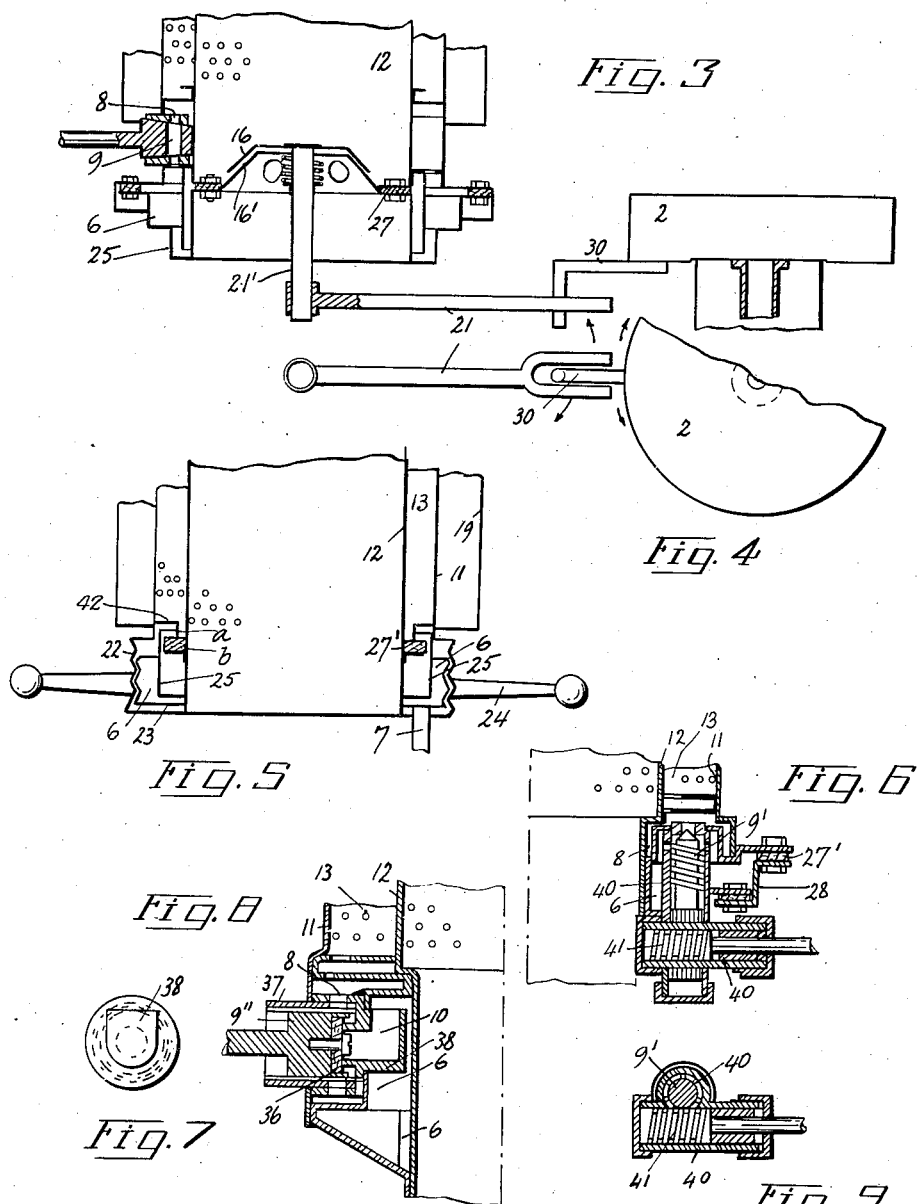

Patented July 1, 1941

2,247,889

UNITED STATES PATENT OFFICE 2,247,889

LIQUID FUEL BURNER

Cesare Paolillo, Milan, Italy

Application March 30, 1938, Serial No. 198,902
In Italy April 2, 1937

7 Claims. (Cl. 158—86)

This invention relates to liquid fuel burners and has for its object the provision of improvements therein.

According to the invention I provide a burner comprising a gasification chamber wherein liquid fuel completely volatilizes under normal pressure, an annular distribution chamber in communication with said gasification chamber through a closed passage, a combustion chamber in communication with said distribution chamber through a series of apertures to cause uniform diffusion of the gas in the combustion chamber, said combustion chamber being formed by two sheet metal bodies, which are for instance cylindrical or truncontical in shape, placed one within the other, perforated over their whole surface in order to permit the entry into said combustion chamber of the air needed for the combustion of the gas and disposed relatively to the gasification chamber so as to transmit the heat generated in the combustion chamber to the gasification chamber by radiation or conduction, the supply of gas from the gasification chamber to the combustion chamber being controlled by a cock, valve or the like, means for heating up the gasification chamber previous to igniting the burner, and means for controlling the entry of air to the combustion chamber through the perforations therein.

In the accompanying drawings:

Figure 1 shows a first form of the invention in fragmentary sectional side elevation; Fig. 2 shows a modified form in sectional side elevation; Fig. 3 shows a sectional view of the form shown in Fig. 1; Fig. 4 shows a plan of part of Fig. 3; Fig. 5 shows a further modified form in sectional side elevation; Figs. 6 to 9 show details.

In accordance with the drawings, 1 denotes the naptha tank, 2 the small feed tank mounted in such a manner as to be adapted to be raised or lowered depending on requirements; 3 the valve through which the small tank 2 receives the naptha from the tank 1 thereabove, 4 a pipe integral with the bottom of the small tank 2, with which it is in communication. 5 is a stuffing box in which slides the pipe 4 during the vertical displacement of the small tank 2. 6 denotes the ring-shaped gasification chamber of the stove. 7 is the pipe which, on receiving the naphtha from the outlet pipe 4 of the small tank 2, delivers it to said gasification chamber 6. 8 is a distribution chamber, also annular, mounted on the gasification chamber 6. 9 is a cock for interrupting the flow of the naphtha gas from the gasification chamber 6 to the distribution chamber 8 by way of pipe 10. 11 and 12 denote the two walls of the carburation and combustion chamber 13 which, in the example illustrated, is cylindrical and of annular cross-section. 14 are apertures made in the top of the distribution chamber 8, through which the gas passes from 8 into combustion chamber 13. 15 are the apertures for the entry of air into chamber 13, provided in the walls 11 and 12 of said chamber. 16 is the movable member of the valve for regulating the amount of air for combustion admited into the apparatus. 17 is a small auxiliary burner fed with volatile fuel through the small tank 18 and intended to heat the gasification chamber when the apparatus is being started up. 19 is a shell surrounding the whole stove.

In the example shown in Fig. 1, the small tank 2 of the naphtha feed means is raised and lowered by means of an unscrewing and screwing movement imparted to the overlying tank, with which it is integral. Said movement is brought about by a guide fixed beneath the small tank sliding on fixed members. The rotary movement of the small tank is transmitted by means of the lever-arms 30 and 21 and valve rod 21' to the valve member 16.

A compression spring 16" is carried by this valve rod 21' and bears against the stationary valve member 16' tends to hold the valve members in close contact. The holes in the member 16' are caused to register with corresponding holes in the member 16, not shown, on rotation of the arm 21 so as to regulate the passage of air passing to the combustion chamber through the inner walls of said chamber correspondingly to the adjustment of the tank 2. Or, the valve member 16 might be controlled manually and independently.

The walls forming the combustion and distribution chambers are secured to those forming the gasification chamber by bolts 27 with the packings 27' interposed to ensure tightness. A metallic member 25 depends from the wall 12 into the gasification chamber to conduct thereto heat from the combustion chamber.

In the example shown in Fig. 2, the regulation of the gas passing into the combustion chamber is accomplished by a cock 9 by varying the aperture that is formed between the fixed part and the movable part thereof, when the movable part is unscrewed. In order to effect conduction of the heat from the combustion chamber 13 to the gasification chamber 6, use is made of the attachments 26 carried by 22 and penetrating the gasification chamber.

In the example shown in Fig. 5, on the other hand, where an embodiment of the apparatus comprising two parts 22 and 23 screwed one on to the other is shown, the transmission of the movement is effected in the reverse manner. The part 22, which is the one to which the movement is imparted, is connected to the small naphtha feed tank, not shown and manually operated by means of the rod 24, so that, when said part 22 is unscrewed, the small tank is lowered. When the movable part is completely lowered, the gasification chamber is closed and its tightness is ensured by the packing in co-operation with the flange 42 integral with part 22. By closing the gasification chamber, the apparatus is extinguished.

Figs. 6 and 9 respectively show a modified form of cock means in sectional side elevation and plan for use in conjunction with the construction shown in Fig. 1. The plug 9' has a conical extremity and is peripherally threaded so as to be rotated by a worm 41 lodged within a casing 40.

Figs. 7 and 8 show a modified form of valve means for controlling the communication between the gasification chamber 6 and the distribution chamber 8 of the construction shown in Fig. 1. The valve proper 9" has at its forward extremity a packing 36 made of copper or other suitable material and is adapted to co-act with a seat formed on a tubular member 38 also containing the passage 10. The valve proper 9" is screwed from outside into a threaded tubular casing 37.

It is evident that the details of construction and form of the apparatus may be modified in other manners than those illustrated in the drawings, without departing from the scope of the invention.

I claim:

1. A liquid fuel burner comprising in combination two coaxial cylindrical hollow sheet metal bodies placed one within the other, a gasification chamber formed between said sheet metal bodies wherein the liquid fuel completely volatilizes under normal pressure, an annular distribution chamber in communication with said gasification chamber between said sheet metal bodies, a combustion chamber in communication with said distribution chamber, between said sheet metal bodies, the distribution and combustion chambers having apertures to cause uniform diffusion of the gas in the combustion chamber and the surfaces of the sheet metal bodies having perforations to permit the entry into said combustion chamber of combustion air, primary valve means for controlling the supply of gas from the gasification chamber to the combustion chamber, means for heating up the gasification chamber previous to igniting the burner, and secondary valve means to control the entry of air into the combustion chamber through the perforations therein.

2. A liquid fuel burner as specified in claim 1, having a removable cover for the gasification chamber, a pipe supplying the gas from the gasification chamber to the distribution chamber, and primary valve means incorporated in such pipe.

3. A liquid fuel burner as specified in claim 1, including a small tank wherein the fuel is maintained at a constant level, wherefrom the gasification chamber is supplied with fuel and which may be vertically displaced.

4. A liquid fuel burner as specified in claim 1, including fixed and movable sheet metal parts forming the gasification, distribution and combustion chambers, inter-acting screw threads on both said sheet metal parts to permit of relative adjustment of these sheet metal parts by screwing to correspondingly vary the size of the gasification chamber, packings interposed between the sheet metal parts to ensure hermetic tightness of the gasification chamber, a small feed tank connected to said movable sheet metal part and moved together therewith, wherein the fuel is maintained at a constant level, wherefrom the gasification chamber is supplied with fuel and which may be vertically displaced.

5. A liquid fuel burner as specified in claim 1 including a small feed tank adapted to be vertically displaced, wherein the fuel is maintained at a constant level and wherefrom the gasification chamber is supplied with fuel and the secondary valve means is connected and moved with the small feed tank and disposed within the inner one of the coaxial sheet metal bodies to regulate the supply of air to the combustion chamber.

6. A liquid fuel burner as specified in claim 1 including a vertical throttle valve between the gasification and distribution chambers, a screw actuating said throttle valve and rotating it about its axis and displacing it vertically.

7. A liquid fuel burner as specified in claim 1, having the gasification and distribution chambers completed by members integrally soldered between the two coaxial sheet metal bodies.

CESARE PAOLILLO.